March 17, 1931.　　　　J. H. WILSON　　　1,796,678
COOKING UTENSIL
Filed Sept. 20, 1929
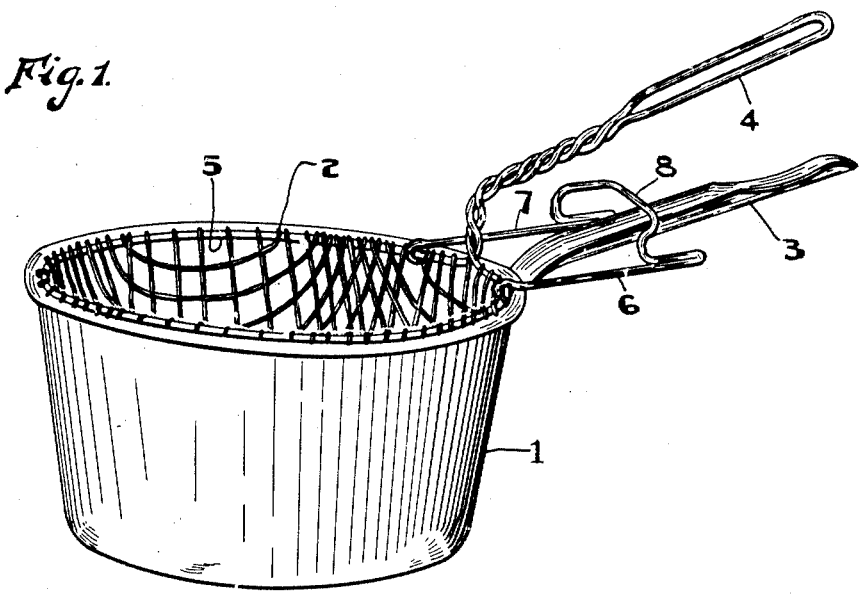
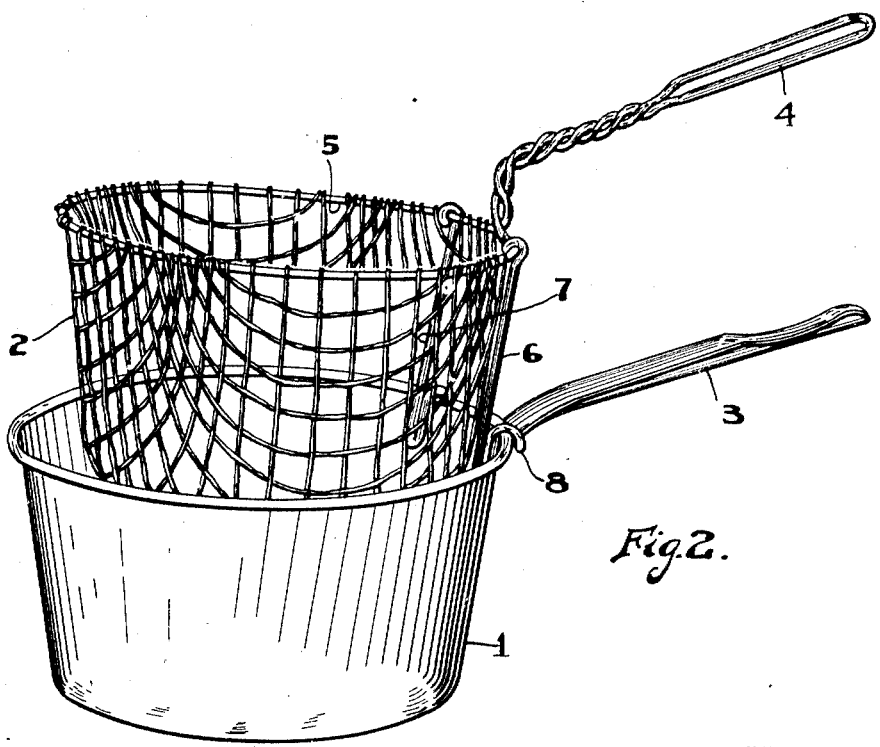
WITNESS
a B Wallace
INVENTOR
John H. Wilson
by Brown & Critchlow,
his attorneys.

Patented Mar. 17, 1931

1,796,678

UNITED STATES PATENT OFFICE

JOHN H. WILSON, OF NEW KENSINGTON, PENNSYLVANIA, ASSIGNOR TO ALUMINUM COOKING UTENSIL COMPANY, OF NEW KENSINGTON, PENNSYLVANIA, A CORPORATION OF PENNSYLVANIA

COOKING UTENSIL

Application filed September 20, 1929. Serial No. 394,058.

The invention relates to cooking utensils, and has particularly to do with those used for deep fat cooking of foods, such as French fried potatoes, doughnuts, oysters and the like.

A cooking utensil of this type comprises a pan, or other suitable receptacle for containing fat, and a food-containing basket adapted to be received by the receptacle and to be removed from it for draining the fat from the food. Such cooking utensils have been provided with means for supporting the basket above the receptacle. In some cases such means are permanently attached to the receptacles, which renders the latter unsuitable for general use, and in other cases the supporting means are so attached to the baskets and are of such forms that the baskets must necessarily be materially smaller than the receptacles to afford required space for the supports when the baskets are in the receptacles. There is thus a loss of space which could otherwise be used for cooking purposes.

The object of this invention is to provide a cooking utensil of the type stated with improved means for supporting a perforate basket above a receptacle to the end that the receptacle may be used for general purposes, and that the basket may fit neatly within the receptacle without loss of space.

The invention is illustrated in the accompanying drawings, of which Fig. 1 is a perspective view of a receptacle and a perforate basket placed in it ready for cooking; and Fig. 2 a similar view showing the basket positioned above the receptacle by the improved supporting means.

According to this invention, a perforate basket, preferably formed to fit neatly within a suitable cooking receptacle, has a bracket pivotally attached to its upper portion for swinging downwardly against, and upwardly free from, the side of the basket. The free end of the bracket is provided with means for engaging the rim of the receptacle to support the basket above it when the bracket is swung downwardly. When the bracket is swung upwardly the basket may be lowered into the receptacle without interference, and may be of such size as to completely fill the receptacle. Preferably the bracket is pivotally attached to the rim of the basket, and preferably it is of U-shape provided at its free end with a rigid hook formed to engage the outer portion of the rim of the receptacle and the interior of the side wall of the receptacle below its rim in such a manner that it affords a cantilever support for the basket.

Having reference to the illustrated embodiment of the invention, Fig. 1 shows a receptacle 1 in which there is arranged a perforate basket 2 of the familiar wire mesh type, the receptacle being provided with a handle 3, and the basket with a handle 4 which may be formed from a continuation of a strand of wire used in forming the rim 5 of the basket. In Fig. 2 the basket is shown positioned above the receptacle by the supporting means provided according to this invention. The supporting bracket here shown is of U-shape, having legs 6 and 7, and a base in the form of a hook 8. The bracket may, as shown, be made of a single strand of wire, the outer ends of legs 6 and 7 being bent around basket rim 5 in such a manner as to permit free pivotal movements of the bracket from its downward basket-supporting position shown in Fig. 2, to its outward receptacle-free-position shown in Fig. 1. The connecting member 8 of the bracket is in the form of a hook which engages the outer portion of the rim of the receptacle, and the bracket legs extend downwardly in positions to bear against the interior of the side wall of the receptacle, thus forming a cantilever support for the basket.

When basket 2 is placed in receptacle 1 for cooking, the supporting bracket is swung upwardly to the position indicated in Fig. 1, in which it is free from the receptacle. When it is desired to drain cooking fat from food, the basket is raised sufficiently to permit the bracket to be swung downwardly against the side of the basket, and to then be hooked upon the rim of the receptacle. Thus there is provided a simple basket support which is in no way attached to a receptacle, and which occupies no space between the basket and the receptacle when the former is in the latter.

Accordingly, the receptacle may be readily used for general purposes without the basket, and the basket may be made of such size that it occupies the entire interior of the receptacle.

According to the provisions of the patent statutes, I have explained the principle and mode of operation of my invention, and have illustrated and described what I now consider to represent its best embodiment. However, I desire to have it understood that, within the scope of the appended claims, the invention may be practiced otherwise than as specifically illustrated and described.

I claim as my invention:

1. The combination with a cooking receptacle, of a perforate basket formed to fit within the receptacle, and a single bracket pivotally attached to the rim portion of the basket for swinging upwardly free from the side of the basket to permit snug insertion of the basket in the receptacle, and also for swinging downwardly to the side of the basket, the free end of the bracket being provided with means extending along the inner wall of the receptacle and for engaging the rim of the receptacle and for forming a cantilever support for the basket above the receptacle when the bracket is swung downwardly.

2. The combination with a cooking receptacle, of a perforate basket formed to fit within the receptacle, and a single bracket pivotally attached to the upper portion of the basket for swinging upwardly free from the side of the basket to permit snug insertion of the basket in the receptacle, and also for swinging downwardly into contact along its length with the side of the basket, the free end of the bracket being provided with a rigid hook formed to engage the outer portion of the rim and to bear against the interior of the side wall of the receptacle below its rim to form a cantilever support for the basket above the receptacle when the bracket is swung downwardly.

3. The combination with a cooking receptacle, of a perforate basket formed to fit within the receptacle, and a single U-shaped bracket having the ends of its legs pivotally attached to the rim of the basket for swinging upwardly free from the side of the basket to permit snug insertion of the basket in the receptacle, and also for swinging downwardly to the side of the basket, the free end of the bracket being provided with means extending along the inner wall of the receptacle and for engaging the rim of the receptacle and for forming a cantilever support for the basket above the receptacle when the bracket is swung downwardly.

4. The combination with a cooking receptacle, of a perforate basket provided with a handle and formed to fit within the receptacle, and a single U-shaped bracket having the ends of its legs pivotally attached to the rim of the basket at points adjacent each side of said handle whereby adapting it to swing upwardly and completely free from the side of the basket to permit snug insertion of the basket in the receptacle, and also for swinging downwardly to the side of the basket, the free end of the bracket being provided with a rigid hook formed to engage the outer portion of the rim and to bear against the interior wall of the receptacle below its rim to form a cantilever support for the basket above the receptacle when the bracket is swung downwardly.

In testimony whereof, I sign my name.

JOHN H. WILSON.